Figure 1:
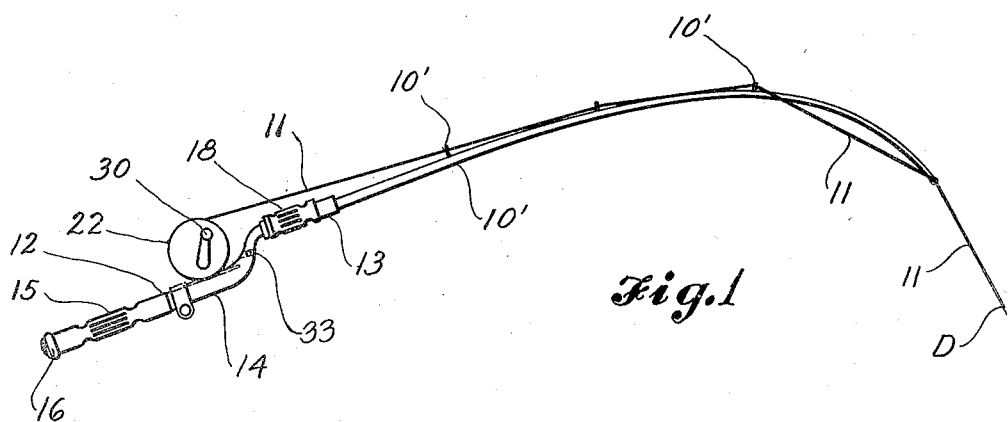

Aug. 24, 1948.     B. C. THOMAS     2,447,720
FISH POLE
Filed March 5, 1946

INVENTOR.
Bernard C. Thomas
BY
G. Ward Kemp
ATTORNEY

Patented Aug. 24, 1948

2,447,720

UNITED STATES PATENT OFFICE 2,447,720

FISH POLE

Bernard C. Thomas, Renton, Wash.

Application March 5, 1946, Serial No. 652,094

2 Claims. (Cl. 43—18)

1

This invention relates to fish poles and particularly to fish poles with an off set stock at the rear end thereof for supporting a reel, and to prevent the reel from wavering, or rocking from side to side when the line is wound in thereby.

In the practice of fishing, especially, for large game fish, it is customary and generally necessary to use a long trolling line and a relatively large reel and large spool therein for leverage for winding in the line. Such reels frequently exceed six inches in diameter, and often exceed four inches in width and the crank of the handle extends additionally on one side thereof. Necessarily such reels project out at right angles from the pole or stock and the weight thereof which frequently amounts to several pounds, with the line, causes the pole to turn till the reel is suspended beneath the line of the pole. In this position it is inconvenient and frequently impossible to turn the crank handle of the wheel and simultaneously maintain uniform tension on the line as the shifting positions of the coils of the line on the spool and the shifting positions of the crank handle when turned in relation to the winding hand of the fisherman caused the reel to sway from side to side which thus renders the turning of the crank still more difficult and frequently occasions a slacking of the line sufficient to enable a game fish to dislodge the hook and escape.

In the use of the ordinary poles and reels for landing large fish it is necessary practice for the fisherman to grasp the pole with one hand at a point in front or beyond the reel for a purchase and to brace the butt end of the pole against his body for fulcrum and to turn the reel with the free hand. Both hands being so employed it is impossible for the operator to normally sustain the reel above the pole in desired steady position for turning the crank handle. Difficulties have also been found in connecting the reels to poles to prevent the loosening thereof in use, and at the same time to be readily disconnected for transportation or for shifting the reels or for right handed and left handed persons. Further difficulties have been caused by the line from the reel chafing over the forward hand of the operator.

It is therefore important that the reel shall be maintained in a steady position for effectual manual turning of the reel crank particularly when a game fish is being drawn in by the reel. It is also important that such reels shall be readily and securely connected in relation to the pole and adapted to be easily released when desired.

Objects of the invention are therefore to provide means for supporting the reels preferably in upright positions in relation to the poles and in such manner that they will not sway or rock from side to side when the reel spool is turned by an extended crank handle. It is important also that said reels be so connected with the poles to guard against a separation thereof with the line from the reel supported in spaced relation from the handle to be grasped by the operator. A further and particular object of the invention is to provide a fish pole with a rear grip section on an offset downward, and a front grip portion with a handle thereon which are connected by a curved neck having a passageway therethrough for guiding a fish line below the handle, the rear or butt end of such grip section being adapted to rest against the body of the operator to support the reel in steady position and prevent lateral motion thereof when the crank is turned for drawing in the line.

Figure 2:
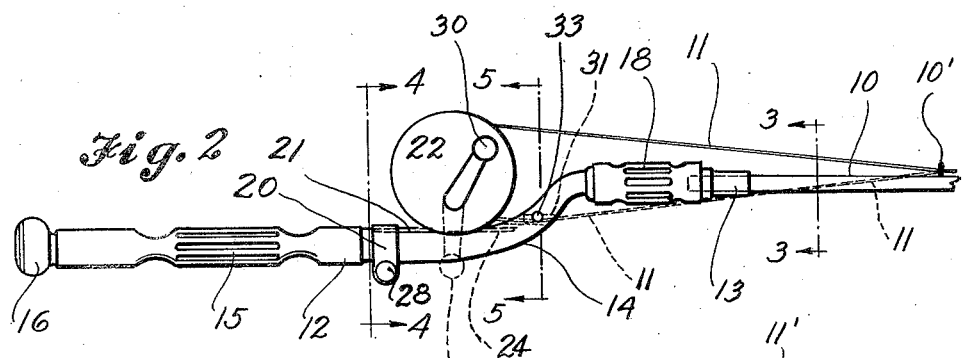

With these and other objects to be hereinafter stated I have illustratively exemplified my invention by the accompanying drawings of which:

Figure 1 represents a side view of an assembled pole, stock, reel and line in use, Figure 2 represents a side elevation of an assembled stock, reel and rear portion of the pole.

Figure 4:
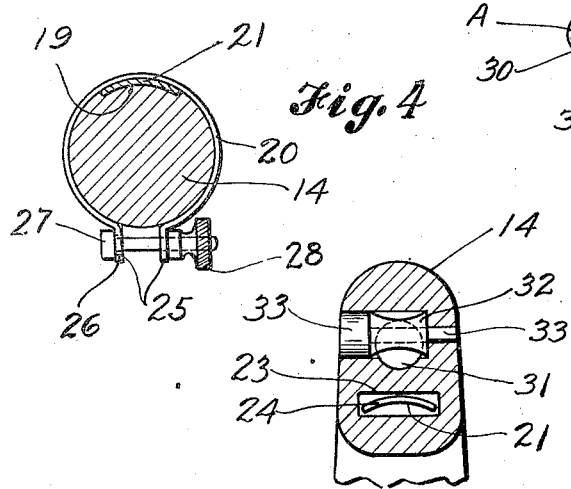
Figure 5:
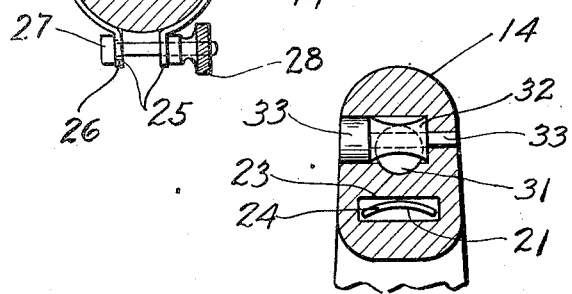
Figure 3:
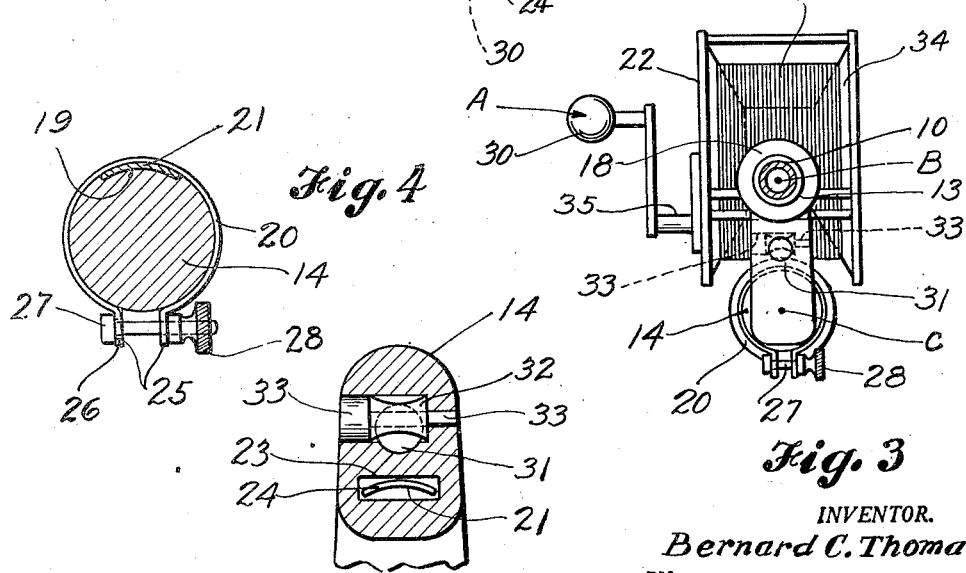

Figure 3 represents a front elevation of the assembly showing the line coiled on the reel spool, also leverage points from the axis of the pole, stock and reel crank, taken on line 3—3 of Fig. 2, Figure 4 is a side elevation in cross section along line 4—4 of Fig. 2, showing the clamp and bolt for connecting the base of the reel, Figure 5 represents an elevation in section taken on line 5—5 for Fig. 2, showing a loose pulley and pintle in the stock for guiding a line.

Like characters on the different figures represent like parts.

Numeral 10 indicates a flexible fish pole with eyes 10' thereon for guiding the fish line 11. 12 represents in general the lower hand grip section of the pole. This stock may be a part of the pole bent in suitable shape but is preferably formed separately and coupled to the pole in any suitable manner as by socket 13. The grip section is preferably shaped as indicated in the drawings with a bend or offset neck 14 adjacent to but spaced back of the pole, and such offset being suitable in degree to provide the desired amount of leverage as hereinafter shown. The lower grip section is provided with a handle 15 and is preferably projected back substantially on the same plane as the axis of the pole but in spaced relation therefrom and the butt end of the section preferably terminates with a knob 16 for resting against the body of the fisherman for a fulcrum when a fish is being drawn in. Said section and neck 14 and handle 18 are preferably formed of plastic or hard wood or non-corrosive metal to resist action of salt water and to provide weight for balancing the pole and for supporting the reel. A portion of the upper face of the section is provided with a depressed surface 19 to provide a seat for the ordinary concaved base 21 of the reel 22. A recess 23 is provided in the neck to retain the toe or front end 24 of the said reel base. The back end or heel is bound in the depression by a clamp band 20, provided with ears 25 and holes 26 therethrough. A bolt 27 is extended through the holes with an adjustable nut 28 for binding the reel to the stock. This binding clamp is important to prevent any accidental loosening or movement of the reel upon the stock and to support the top of the reel above the axis of the pole and to maintain the fish line from the reel in spaced relation above the handle 18 to facilitate grasping of the hand thereon, but may be easily slackened by hand for changing the reel.

Where an ordinary large double action type of reel is used as indicated in Fig. 3, the line 11 is drawn in over the top of the drum or spool 34 of the reel by a connected crank 30, the line moving above the handle. But when the reel is used in reverse position for a lefthanded operator or when a single roller reel is used the crank is extended from the other side of the reel and the line is then ordinarily wound in from the bottom of the reel roller. In order to conduct the line forward on such lower level from the bottom of the reel a passageway 31 is provided through the neck 14 and a guide pulley 32 is loosely mounted on a pintle 33 in the neck and crosswise over the passageway. The pulley is thus adapted to facilitate the movement of the line and also to depress the line downwardly to extend forward in spaced relation below said handle 18 and to lighten pressure of the line on the hand of the operator above.

In use when a powerful or heavy fish is on the line, the fisherman positions the knob or butt of the stock against his body for a fulcrum. Meanwhile the pull of the fish tends to draw and bend the pole downward. The operator then grips the handle 18 in front of the reel for a purchase with one hand and lifts against the force of the fish and raises the handle. The purchase point on the handle is so raised in elevated relation above the pole and the offset stock and the reel sustained in upright position to be operated easily by the other hand. In operation a changing position of the axis A of the reel crank when turned, and the shifting points of the coils of line 11' on the spool tend to rock the reel from side to side and roll the pole on its axis B and interfere with the easy turning of the reel. This lateral stress is overcome by the leverage provided by the offset stock by its axis C which operates as a crank or lever to sustain the reel in steady upright position.

Having described my invention I claim as new:

1. A fish pole having grip sections, one of which is in offset relation to the other and is provided with a reel thereon, one of said grip sections having a handle, a second of said grip sections being connected to the first grip section by a neck extended upward from the front end of the first section and secured to the second grip section and having a handle thereon, said neck having a passage therethrough for guiding a line from the reel to a point in advance of the second grip section and maintaining the line below the latter section.

2. A fish pole including a front and rear section, said front section having guides thereon for guiding a fish line and a handle on its rear portion, the said rear section being offset below the rear portion of the front section and having a supporting surface for a reel base to locate the said base below the rear portion of the front section, said sections being connected by a neck portion having a passage therethrough for guiding a fish line from that portion of the reel adjacent the base to the guides of the front section and maintaining the line below the handle of the said front section.

BERNARD C. THOMAS.

REFERENCES CITED

The following references are of record in the file of this patent:

UNITED STATES PATENTS

| Number | Name | Date |
| --- | --- | --- |
| 333,232 | Kopf | Dec. 29, 1895 |
| 596,799 | Andrews | Jan. 4, 1898 |
| 2,057,535 | McKechnie | Oct. 13, 1936 |
| 2,065,153 | Proudfit | Dec. 22, 1936 |
| 2,324,353 | Berry | July 13, 1943 |